(12) United States Patent
Asbeck et al.

(10) Patent No.: US 7,096,575 B2
(45) Date of Patent: Aug. 29, 2006

(54) METHOD OF AND DEVICE FOR JOINING ASSEMBLED HOLLOW SHAFTS

(75) Inventors: Jochen Asbeck, Attendorn (DE); Henning Blöcker, Stelle (DE)

(73) Assignee: Muhr und Bender KG, (DE)

( * ) Notice: Subject to any disclaimer, the term of this patent is extended or adjusted under 35 U.S.C. 154(b) by 440 days.

(21) Appl. No.: 10/360,951

(22) Filed: Feb. 7, 2003

(65) Prior Publication Data

US 2003/0150095 A1 Aug. 14, 2003

(30) Foreign Application Priority Data

Feb. 8, 2002 (DE) ................ 102 05 540

(51) Int. Cl.
*B23P 19/027* (2006.01)
(52) U.S. Cl. .......... 29/796; 28/888.1; 28/523
(58) Field of Classification Search ........... 29/888.1, 29/464, 523, 796, 799
See application file for complete search history.

(56) References Cited

U.S. PATENT DOCUMENTS

| | | | |
|---|---|---|---|
| 3,999,277 A * | 12/1976 | Hamada | 29/447 |
| 4,750,250 A | 6/1988 | Maus et al. | |
| 4,875,270 A * | 10/1989 | Krips et al. | 29/421.1 |
| 4,881,680 A | 11/1989 | Toelke et al. | |
| 5,052,845 A * | 10/1991 | Maus et al. | 29/888.1 |
| 5,054,182 A | 10/1991 | Riemscheid et al. | |
| 5,097,582 A | 3/1992 | Kreher et al. | |
| 5,195,229 A * | 3/1993 | Hughes | 29/252 |
| 5,195,239 A | 3/1993 | Breuer et al. | |
| 5,280,672 A * | 1/1994 | Hochstein | 29/888.1 |
| 6,615,468 B1 * | 9/2003 | Bloecker et al. | 29/281.1 |

FOREIGN PATENT DOCUMENTS

| | | |
|---|---|---|
| DE | 37 26 083 C2 | 7/1989 |
| DE | 39 41 718 C2 | 6/1991 |
| DE | 199 57 508 C1 | 6/2001 |
| GB | 2 156 937 A | 10/1985 |

* cited by examiner

Primary Examiner—David P. Bryant (57) ABSTRACT

A method and device for joining assembled hollow shafts which consist of a tube and several attachable parts such as cams, flanges, bearing sleeves, pulse generating devices, toothed gears and chain gears slid on to the tube, wherein the tube, inside the attachable parts, is radially plastically expanded in individual portions by applying internal pressure in such a way that the attachable parts are secured to the tube by a permanent press fit, wherein the attachable parts and the tube are individually positioned and fixed relative to one another and wherein the tube is sequentially plastically expanded in individual portions associated with the individual attachable parts.

19 Claims, 8 Drawing Sheets

METHOD OF AND DEVICE FOR JOINING ASSEMBLED HOLLOW SHAFTS

TECHNICAL FIELD

The invention relates to a method of and device for joining assembled hollow shafts and attachable parts. In particular, the invention relates to radially plastically expanding portions of the tube by applying internal pressure in such a way that the attachable parts are secured to the tube by a permanent press fit. The hollow shafts may be, for example, tubular camshafts or driveshafts. The attachable parts may be, for example, cams, flanges, bearing sleeves, trigger discs, toothed gears or chain gears which are slid onto the hollow shafts.

BACKGROUND OF THE INVENTION

In such hollow shaft assemblies, the drive elements, such as the cams and driving pinions of a camshaft, are each produced as individual elements with through-apertures. The drive elements are then slid on to the hollow shaft or tube. Thereafter, a probe member is slid into the tube. The probe member comprises individual operating regions which are axially associated with the drive elements. Each operating region includes a probe portion which is delimited by two annular seals. A hydraulic medium can be applied in the operating region at a high pressure of up to 3000 bar, for example. As a result, the tube is plastically expanded in the respective longitudinal portion, thus securing the drive elements on the hollow shaft. The deformation of the drive elements preferably takes place in the purely elastic range.

U.S. Pat. No. 4,750,250 discloses, in general, a method and a device for simultaneously fixing a plurality of drive elements such as cams, gearwheels and bearing bushes on a hollow shaft in one operation. The problem of holding the drive elements in an accurate position relative to the hollow shaft, particularly with respect to angular accuracy, however, is not satisfactorily addressed.

U.S. Pat. No. 5,195,239 describes a method and a device for positioning all of the drive elements on a hollow shaft. In this case, too, after all the drive elements have been positioned, all the drive elements are jointly joined on the hollow shaft by simultaneously expanding the hollow shaft in the individual portions associated with the drive elements. The drive elements are positioned with respect to their axial and angular positions by electromagnetic forces. Given the magnetic properties of the drive elements and of the hollow shaft, however, the accuracy of this method of positioning raises concerns. Moreover, the device in which the hollow shaft is held has a horizontal axis which is very difficult to automate.

U.S. Pat. No. 5,054,182 discloses methods and devices for joining a shaft of the above-mentioned type, wherein all the drive elements are first slid on to a hollow shaft and wherein the hollow shaft is then inserted into an overall device which comprises a divisible die for each individual drive element. Each divisible die holds the respective element in a predetermined axial and angular position relative to the hollow shaft and the remaining drive elements, respectively. Various embodiments disclose part axes in a horizontal position and part axes in a vertical position. These devices are very difficult to automate. In addition, they are totally unsuitable for shafts with different designs because each joint type requires its own set of die inserts. The overall device has to be newly set up for the axial positions of the individual divisible dies.

The above-mentioned methods have common disadvantages in that, because of the large number of operating portions of the probe, the number of possible faults which might occur is increased, and it is not easy to immediately identity the source of the fault. If the hydraulic pressure curve is indicating any malfunction while the probe is being operated, the entire assembled shaft has to be regarded as a reject.

If different hydraulic pressures have to be applied to different individual portions of the hollow shaft, for example for a spur gear flange on the one hand and for cams on the other hand, this can only be achieved by means of a highly complicated probe design.

Within a relatively short time, the unavoidable wear of the annular seals at the probe, which seals delimit the operational portions in pairs, leads to the need to replace the annular probe seals. This is a complicated operation.

SUMMARY OF THE INVENTION

The present invention provides a method and device which, while featuring a simplified design for the device, are suitable for automating the process to a considerable extent. In the present method, the attachable parts and the tube are individually positioned and fixed relative to one another. The tube is then sequentially plastically expanded in individual portions associated with the individual attachable parts. A device according to an embodiment of the invention provides one single positioning and fixing unit for the attachable parts and one single holding and positioning device for the tube. By applying the present method wherein the drive elements are positioned individually on the hollow shaft and thereafter secured one after the other, the device is greatly simplified in that only one single positioning and fixing device is required for the drive elements. The positioning and fixing device is reloaded sequentially. The design of the probe is also simplified in that it only requires one single operating portion. If operating portions of different lengths are required, it is relatively easy to provide different probes which comprise one operating portion each and which are alternatively placed into the required position. Faults are also more readily detectable. For example, if, as a result of a leakage at the probe, the joining operation does not result in a proper pressure build-up, the respective fault can be identified immediately. The joining operation can then be repeated without there necessarily occurring any assembly rejects.

According to one method, the attachable parts are individually positioned and fixed in space. For each attachable part, the tube is moved into an associated, predetermined axial and angular position, and an individual tube portion axially associated with the attachable part is plastically expanded. The respective device is designed in such a way that the positioning and fixing unit is fixed in space, and the holding and positioning device for the tube, with reference to the tube axis, is axially and rotatingly drivable relative to the positioning and fixing device. This embodiment has a considerable advantage in that the positioning and fixing device for the attachable parts, particularly cams, can be held in a stationary condition, which, at the same time, greatly facilitates automatic loading of the positioning and fixing device, while all the relative positions of the parts relative to one another can be controlled by axial and rotational movements of the tube in space. The respective control processes can be carried out by a NC control unit. The relative positions of the attachable parts relative to one another on the tube are highly accurate because of the identical positioning of the holding and fixing device. During the entire process, the clamping condition of the tube remains unchanged.

According to a first embodiment of the method, the joining stages for all the attachable parts on one tube take place in one single common device (joining station). This is particularly advantageous for small production runs. With the clamping conditions of the tube in a chuck remaining unchanged, this leads to the greatest possible positional accuracy of the attachable parts relative to one another.

According to a second embodiment of the method, there is provided a plurality of devices (joining stations), wherein in each joining station only one single attachable element is positioned on the tube and joined therewith. The number of joining stations corresponds to the number of attachable parts for a shaft, with the overall system, optionally, being provided with a reserve station. To ensure that the angular accuracy continues to be maintained, the clamping conditions of the tube, in this case, too, should remain unchanged. For this purpose, the tube is associated with a chuck which, in each one of the stations, can be fixed in accurate angular positions and at accurate heights by means of clamping and stopping faces at the chuck in a receiving or holding device.

In another embodiment, each station comprises a tool changing unit by means of which a tube provided with an additional attachable element can be replaced by a tube which has yet to be provided with the respective attachable element. As already mentioned, the handing-over and clamping operations take place directly at a freely transferable chuck associated with the tube. The tool changing unit is preferably arranged at the holding and positioning device for the tube.

In a further embodiment, workpiece transporting units of the pallet type are provided and are guided on a transport track from station to station. They are stopped at the individual stations by a stopper which can be slid into the transport path. The transporting units are clamped in by a clamping mechanism in accurate positions relative to the position in the transport path and relative to the vertical alignment of the tube. Such workpiece transporting units can preferably also be used in an individual station, so that the processes of entering workpieces into the station and removing same from the station can be automated.

In another embodiment, the workpiece transporting units of the pallet type also carry, in a die, a complete set of attachable parts for a complete hollow shaft, such as a camshaft, with the number of parts in the die being reduced by one from station to station.

For example, in a particular station, after one of the transport units has been moved in and fixed, first a newly moved-in tube on the transport units replaces a tube which is already located in the station and has been provided with the respective attachable part. The tube partially equipped with attachable parts, in each station, stays behind by one station relative to the transport unit into which it was first inserted before entering the first station.

The transport units are moved in identical phases from station to station. Accordingly, the joining operations take place in identical phases in all stations.

Equipping the transport units with a complete set of parts is greatly advantageous in that for the complete system, equipping can take place in one single equipping station. This equipping operation can be carried out manually, but with large production runs it can also be carried out automatically. In the case of manual equipping, the equipping station can be followed by an automatic checking station for correctness and completeness of equipment. The transport units preferably run on a closed loop. Behind the last joining station, the completed hollow shaft is ejected, with the clamping mechanism in the chuck preferably not being released, i.e. the chuck leaves the plant together with the hollow shaft. In this way, the chuck can possibly facilitate subsequent operations such as straightening, cutting to lengths and measuring. The chuck can again be clamped into the respective receiving devices in the operating stations by means of a high-speed clamping mechanism.

In another embodiment, the attachable elements preferably do not leave their transport plane from station to station when they are removed from the pallet-type transport unit and inserted into the positioning and fixing device. In this way, the transport means for the attachable elements in the stations can be simplified in such a way that they can only be moved in one plane along two axes. In this embodiment, the elements can only be deposited in the station, whereas they are lifted out of the station by controlling the positioning mechanism for the tube after the joining operation.

It is particularly advantageous that the individual joining stations are designed identically and can be used universally. Of course, the stations should be programmed in such a way that the attachable element in the highest position on the tube is joined in the first joining station and from there, the elements are joined in stages descendingly down to the attachable element in the lowest position on the tube in the last joining station.

The tube expanding probe is preferably adjustable between two levels. When inserting the attachable element into the positioning and fixing unit, the free probe end with the operating portion is withdrawn downwardly. Subsequently, after the attachable element has been inserted and fixed, the free probe end is moved forward into the positioning and fixing unit in such a way that the operating portion is positioned inside the attachable element. In order to ensure an accurate axial position at the probe end, the free probe end, for the purpose of being moved forward, is temporarily centered in a guide which can be tensioned and which does not prevent the probe from being slid through. As soon as the probe has been slid into the attachable element and is still centered and held therein, the lower open end of the tube is lowered from above, introduced into a centering device, and guided over the probe end. When the tube surrounds the probe, the probe fixing device is opened, so that the tube, as far as necessary, can be slid downwardly on to the probe. Thereafter the tube is firmly clamped in at its lower end, with the probe centering itself via the sealing rings on both sides of the operating portion inside the tube. The attachable element, which can be fixed by a pneumatic mechanism, is able to expand radially during the subsequent hydraulic expanding operation and thus center itself on the tube.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIG. 1 shows an inventive joining station
A) in a side view
B) in an end view
C) in a plan view.

FIG. 2 shows a pallet for attachable parts with the tube holding device in the form of a detail
A) in a side view
B) in a plan view.

FIG. 3 shows a horizontal transporting unit for attachable parts in the form of a detail
A) in a side view
B) in a plan view.

FIG. 7 shows an inventive shaft assembly in a partial illustration
A) in a longitudinal section
B) in a cross-section through a cam.

DETAILED DESCRIPTION OF THE INVENTION

Below, the three illustrations of the joining station according to FIG. 1 will be described jointly. Three axes of movement have been given the reference symbols x, y, and z. A rack 90 is shown comprising a workpiece transporting unit 10 which is horizontally transportable in the direction of arrow P. The workpiece transporting unit 10 includes a pallet 11 and a stand 15. The pallet workpiece transporting unit 10 runs on a transport track 13 extending inside the device. In particular, it is possible, here, to provide one groove at the pallet 11 at the groove edge extending parallel relative to the direction of movement and two bores at the opposite edge extending parallel relative to the transport direction. The receiving mechanism is loaded from one side by a 90° prism extending parallel relative to the transport direction and, from the other side, by two tapered pins positioned in the same horizontal plane, so that the pallet 11 is fixed in an accurate horizontally aligned position and in an accurate position on its transport path. On a base plate 12 of the pallet, there is positioned a die 14 which serves to accurately position a complete set of attachable elements for a hollow shaft such as a camshaft. On the base plate 12, there is arranged an accurately vertically aligned stand 15 to whose upper end there is secured a holding and clamping device 16 for an individual chuck 17. The chuck 17 comprises outer engaging devices which are positioned in the holding device 16 in a play-free and angularly accurate way. A tube 18 is firmly clamped into the chuck 17 and maintains the tube 18 firmly clamped in position during the entire joining process in accordance with the invention.

The rack 90 is provided with a further stand 19 in which a numerically controlled tube holding and positioning device 20 is vertically movable by means of a linear driving motor 21. In the tube holding and positioning device 20, there is provided a second chuck 23 which can be of the same type as the chuck 17, and a second holding device 22. However, the second holding device 22 deviates from the first holding device 16 in that it is provided with a numerically controlled rotary drive 24 which is able to move the holding device 22 and thus the chuck 23 into any rotational position inside the rack 90. A further tube 18' is clamped into the chuck 23. The tube 18' in the chuck 23 has already been equipped with an attachable part and, in this case, is replaced by the tube 18 in the stand 19.

Between the two chucks 17, 23, there is provided a workpiece changing device 25 which is secured to the tube holding and positioning device 20 and which comprises two radially opposed gripping arms 26, 27 and a rotary head 28. By rotating the rotary head 90°, the workpiece changing device built in the design of the standard tool changing device is able, simultaneously, to embrace both chucks 17, 23 which are then released from their holding devices 16, 22, and by continuing to rotate the rotary head 28 by 180°, the chucks can be exchanged relative to one another until they are again taken over by the holding devices 16, 22. Thereafter, the rotary head 28 can be rotated back by 90°, so that the tube in the position of the first chuck 17 can be replaced by another tube by transporting the pallet 11 further and moving in a further pallet. The tube in the position of the second chuck 23 can then undergo the stages and movements required for a joining operation.

In addition, the rack 90 is provided with a horizontal transport unit 30 with a three-prong gripper 32 (FIGS. 3A and 3B) which comprises a first transverse guide 33 for a carriage 31 with a gripper 32 extending transversely to the direction of transport. The transverse guide 33 is secured to a slide 34, as well as a longitudinal guide 35 for the slide 34 moving in the transport direction. The gripper 32, in turn, comprises a vertical guide 36. The gripper 32 and the guides 33, 35, 36 can be used for numerically controlling the individual attachable elements, removing the attachable elements from the holding device 16 in the die 14 and moving them into a positioning and fixing unit 40 whose center is positioned underneath the axis of the second chuck 23.

Underneath the fixing unit 40, there is arranged a probe holding and guiding device 60 in which there is held a hydraulic pressure agent probe 64 and which can be moved axially into two positions. Furthermore, the probe holding and guiding device 60 comprise a gripping unit 65 by means of which the probe 64 can be temporarily fixed when a tube is slid on. However, the gripper 65 is opened again immediately, so that, depending on the predetermined position of the attachable element on the tube, the latter can be moved downwardly significantly beyond the probe 64. For the purpose of inserting the attachable element into the fixing device 40, the probe 64 is moved axially into its lower position, so that the inserting movement is not obstructed. Subsequently, and prior to lowering the tube, the probe 64 is moved into its second higher position, with the operating portion of the probe coming to rest inside the attachable element.

Figure 2A:
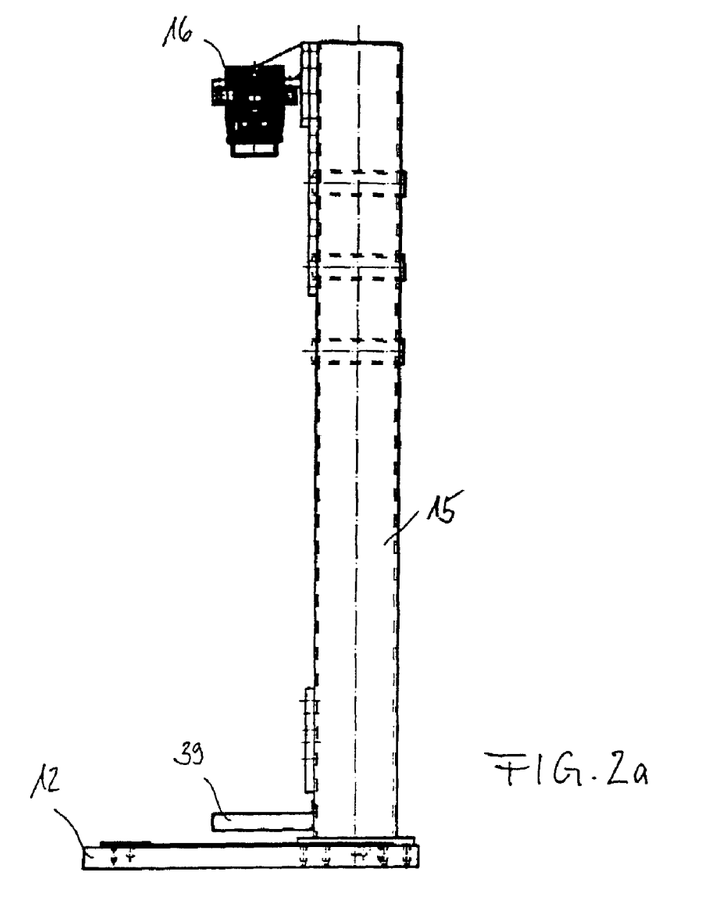
Figure 2B:
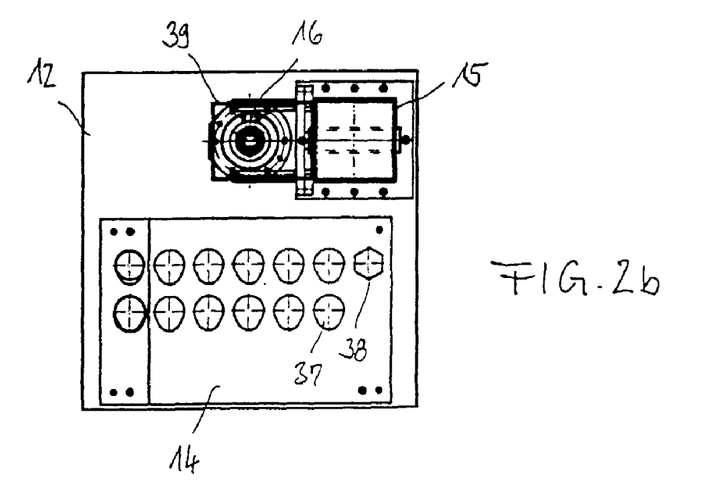

The two illustrations of FIG. 2 will be described jointly below. They show, in the form of an enlarged detail, the workpiece transporting unit 10 with the pallet base plate 12, the die 14 bolted on to the base plate 12, the stand 15 also bolted to the base plate 12, as well as the holding device 16 attached to the stand. The holding device 16 is intended for a chuck. The die 14 is provided with twelve recesses 37 into which there can be inserted individual cams whose angular positions roughly correspond to those of said recesses 37, as well as hexagonal recesses 38 into which a cylindrical bearing sleeve can be inserted, for example. These different recesses 37, 38 can be numerically controlled by the above-mentioned gripper 32. Underneath the holding device 16 there is provided an oil catching dish 39 which is able to catch oil dripping from the tube equipped with at least one attachable element, so that the oil is not lost or reaching the transport track. As already mentioned, the holding device 16 is arranged in such a way that the chuck 17 can be held in an accurate position with regard to the angle of rotation. The chuck 17 can also be held rectangularly relative to the base plate 12 and, consequently, relative to the rack 90, with the pallet 11 being clamped in.

Figure 3A:
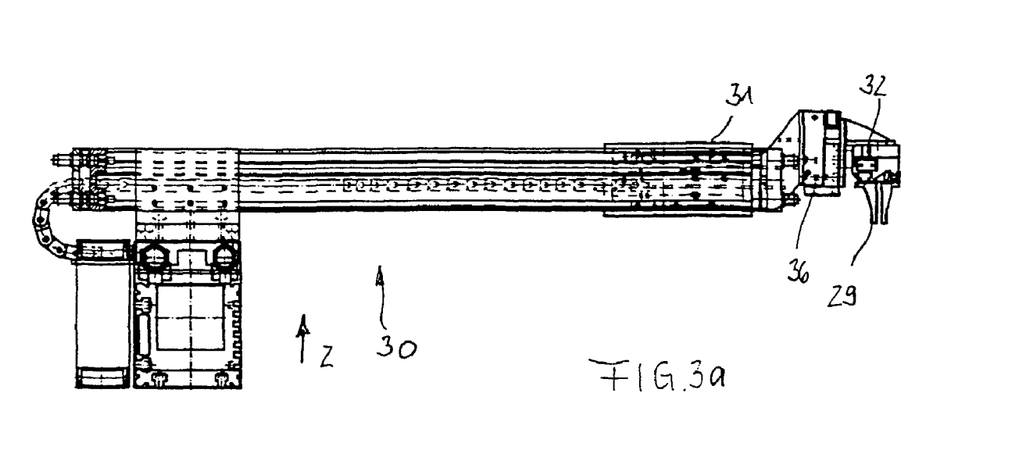
Figure 3B:
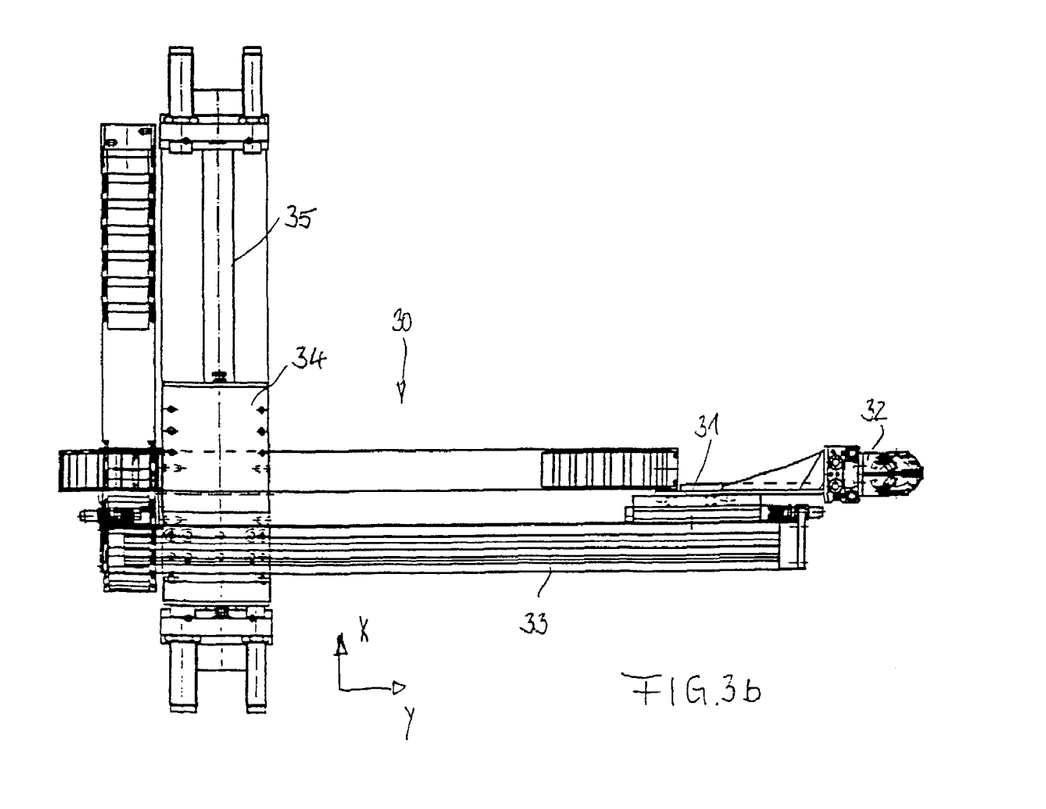

The two illustrations of FIG. 3 will also be described jointly below. They show a gripper head 32 which is arranged at a carriage 31 which can be moved on a rail or transverse guide 33 in the direction of the Y-axis. The transverse guide 33 is held in a slide 34 which, in turn, is movable on a longitudinal (slide) guide 35 along the X-axis. The gripper head 32, in turn, is movable in a vertical guide 36 at the carriage 31 in the direction of the Z-axis. The gripper 32 comprises three radially adjustable prongs 29. If necessary, the adjustability of the gripper head in respect of height in the direction of the Z-axis can be eliminated if the prongs 29 can be opened to such an extent that they laterally approach the attachable parts and centrally enclose and grip same.

Figure 4A:
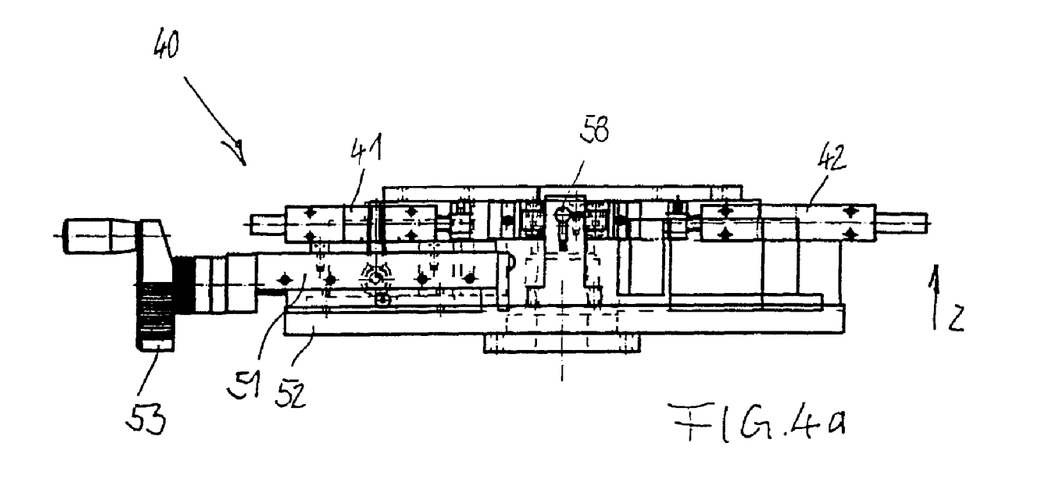
FIG. 4 shows a positioning and fixing device for attachable parts in the form of a detail.
Figure 4B:
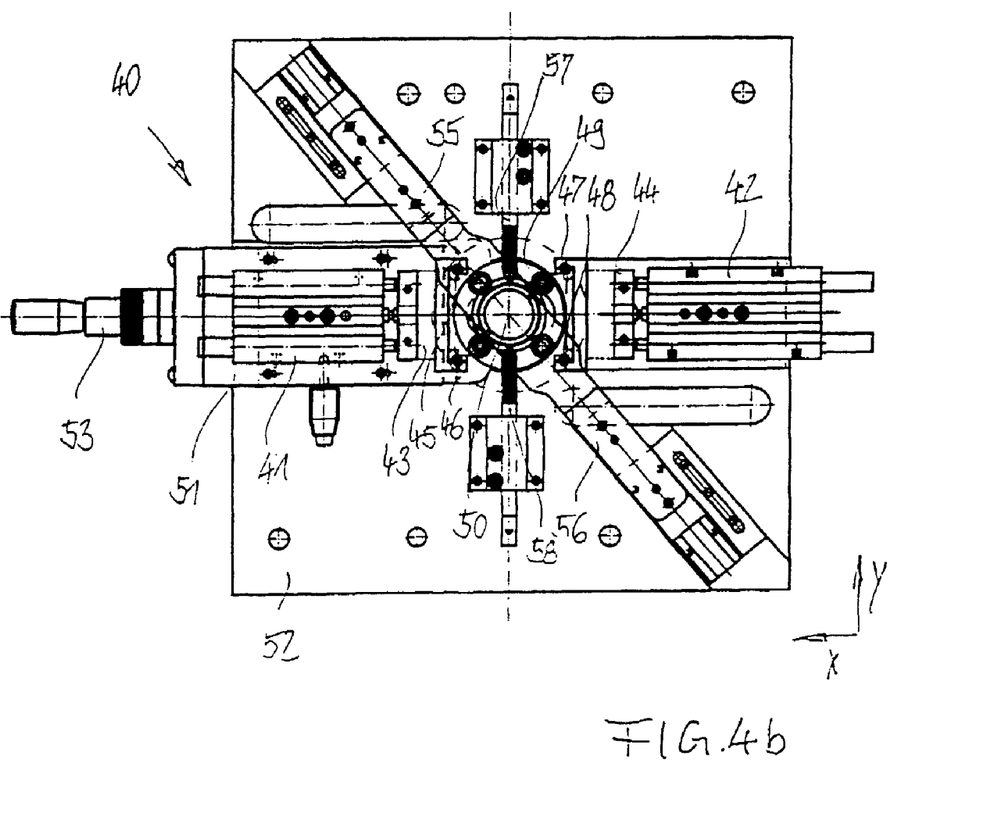

The two illustrations of FIG. 4 will also be described jointly below. The positioning and fixing unit 40 shown in FIG. 1 in its entirety only comprises a base plate 52 on which there are mounted several clamping devices and holding devices. The clamping and holding devices can be pneumatic devices. A first pair of cylinder housings 41, 42 with holding jaws 43, 44 serves to hold and fix one of the attachable parts, such as a cam. At the front ends of the pairs of jaws 43, 44, there are provided rollers 45, 46, 47, 48 with vertical roller axes, so that a cam placed on to an annular disc such as a carrying ring 49 is centered on the axis 50 when the holding jaws 43, 44 are closed. The cylinder housing 41 of the holding jaw 44 is adjustable by means of a slide 51 relative to the plate 52 in the direction of the X-axis. For this purpose, there is provided an adjusting crank 53. On the other hand, the cylinder housing 42 of the holding jaw 44 is arranged firmly on the base plate 52. The cylinder unit 41 acts at a higher pneumatic pressure than the cylinder unit 42, so that the jaw 43 constitutes a fixed stop and the jaw 44 a resilient stop.

When the attachable part (i.e., cam) has been placed on to the carrying ring 49 and is substantially centered on the axis 50, two clamping jaws 55, 56 with semi-circular recesses are moved forward towards each other, with said semi-circular recesses being gripped at their top ends. The resulting conical introducing aperture makes it possible to thread the tube accurately into the through-aperture of the attachable part, such as the cam, when the tube is subsequently lowered.

When the tube has been moved in and fixed, and before the subsequent operation of expanding the tubular portion inside the attachable part, two measuring scanners 57, 58 contact the attachable part for the purpose of recording the deformation of same as a function of time during the expanding operation. It should be noted that, on the one hand, a permissible amount of elastic deformation should not be exceeded in order to avoid crack formations in the attachable part. On the other hand, the remaining elastic deformation should be such that it is possible to assume a sufficiently high plastic deformation of the tube portion to ensure a fixed and firm fit of the attachable part.

Figure 1A:
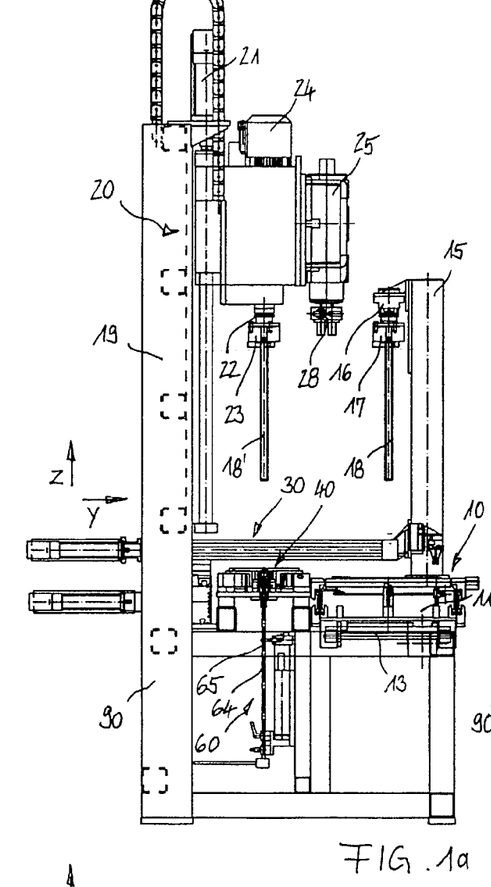
Figure 1B:
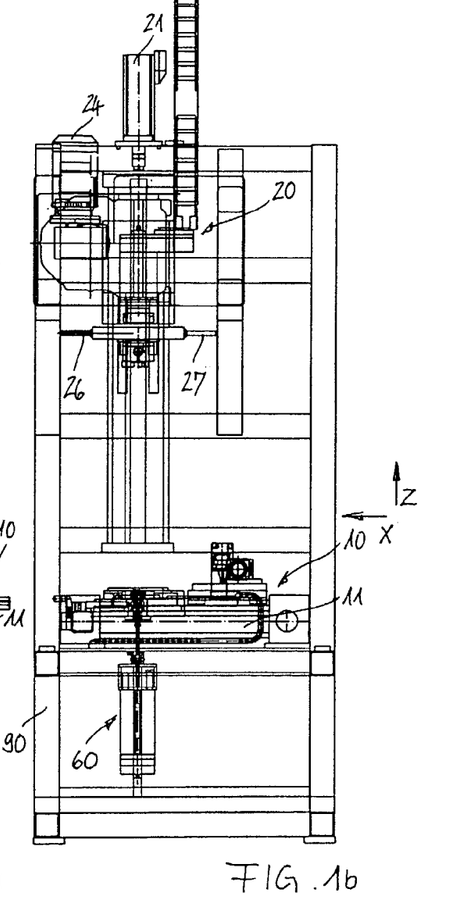
Figure 1C:
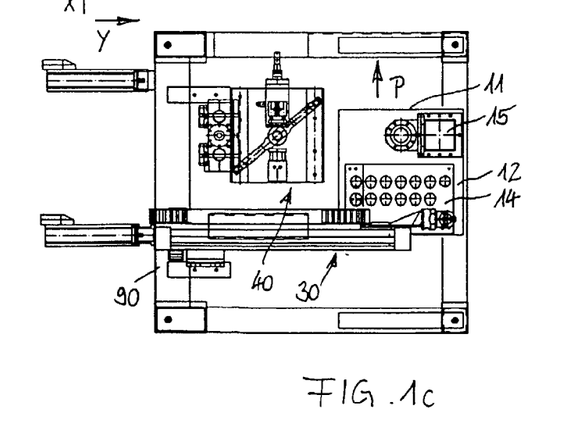
Figure 5:
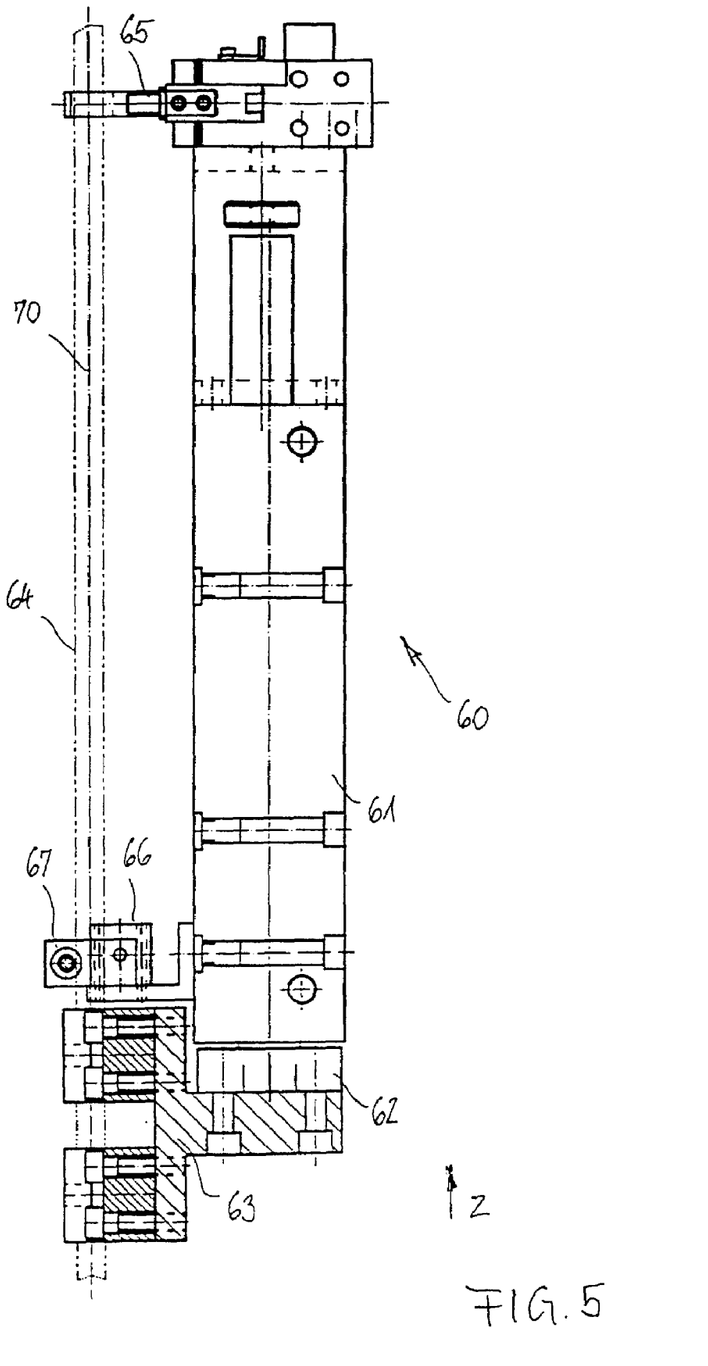
FIG. 5 shows a probe holding device in the form of a detail in a side view.

FIG. 5 shows the probe holding and guiding device 60 in the same view as in FIG. 1*a*. In a cylinder housing 61, there is provided an actuating cylinder 62 which is movable in the direction of the Z-axis and which is adjustable between an upper position as illustrated and a second lower position. At the actuating cylinder 62, there is provided a clamping device 63 which clamps in a probe member 64 shown in dashed lines only. The lower probe member 64 shown in a broken-off condition at the lower end is followed, at the lower end, by a pressure agent supply for a hydraulic medium. The upper end of the probe member, which is also shown broken off, is followed by an axially delimited operating portion which, between two annular seals, comprises an exit aperture for a hydraulic medium. At the upper end of the cylindrical housing 61, there is provided an adjustable clamping device 65 which centers the probe axis 70 accurately on the above-mentioned axis 50 of the positioning and fixing unit 40 without obstructing the axial mobility of the probe between two said positions. The clamping device 65 preferably opens as soon as the operating portion of the probe has been moved into the attachable part and before the tube is subsequently, from above, slid over the probe end and introduced into the through-aperture of the attachable part. At the lower end of the housing 61, there is provided a light barrier element 66 which cooperates with a corresponding reflector 67 which is secured to the probe member 64. The light barrier element 66 and reflector 67 are configured to form a functional stop if the probe member is incorrectly displaced downwardly by an incorrectly threaded-on tube.

Figure 6:
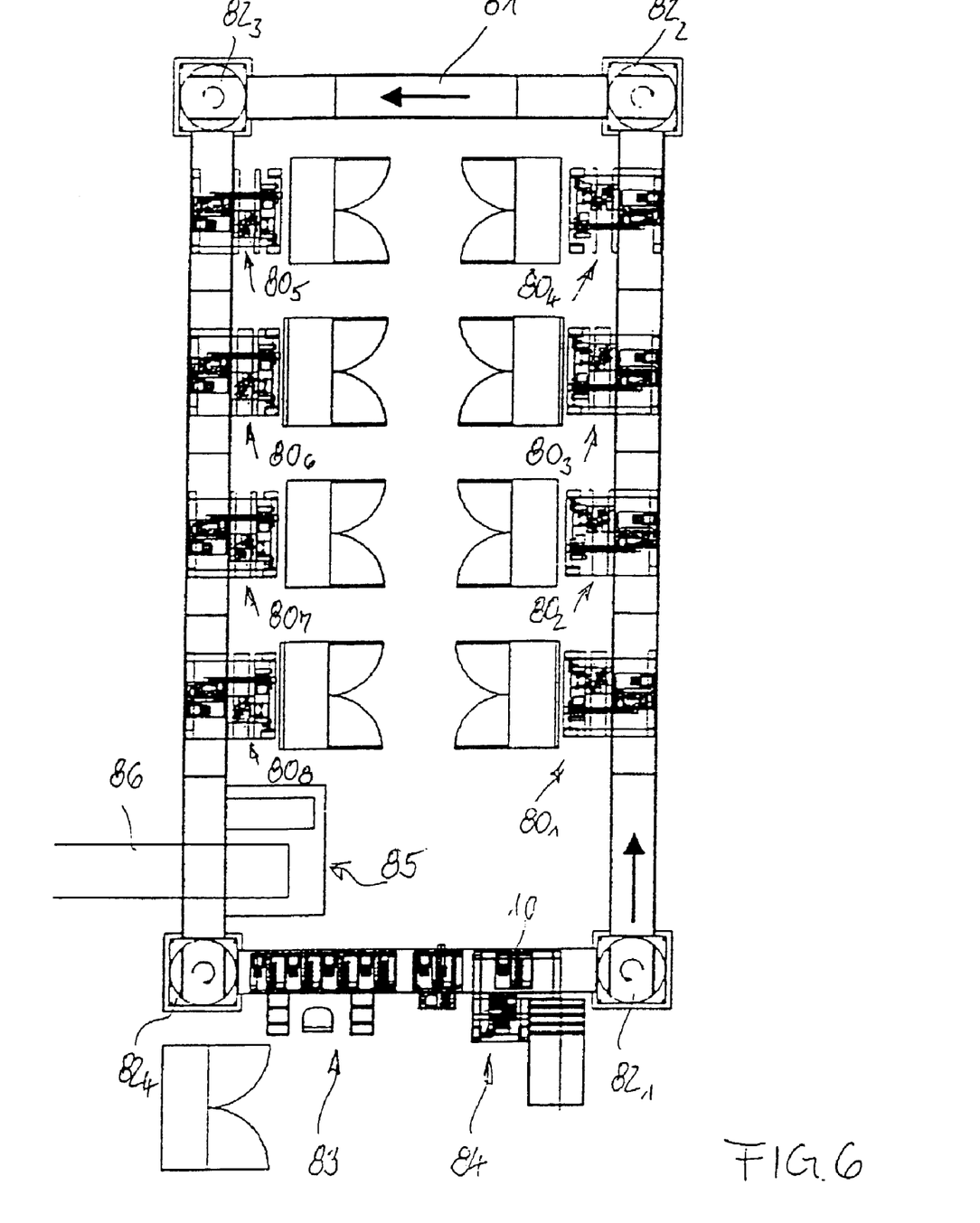
FIG. 6 shows a complete system with eight individual joining stations according to FIG. 1 in a plan view.

FIG. 6 is a plan view of a system with eight complete joining stations 80 which are positioned inside an infinite rectangular conveying track system or transport loop 81 which comprises rotary stations 82 at the respective corner points. The conveying track system can comprise conveyor belts or roller tracks. At one of the shorter ends of the track system 81 there is arranged an equipping station 83 in which workpiece transporting units are equipped with a complete set of attachable parts and with a tube clamped into a chuck. In accordance with the illustration, it can be a station wherein equipping is carried out manually, but the station can easily be automated. On the transport path moving counter-clockwise, there follows a checking station 84 for checking the results of the equipping operation, which checking station 84 is preferably automated. A number of workpiece transporting units 10 are indicated in front of the equipping station 83 and the above-mentioned checking station 84. After a workpiece transporting unit has been rotated in the rotary station $82_1$, the workpiece transporting unit passes the first four joining stations $80_1$, $80_2$, $80_3$, $80_4$ which are integrated into the transport path. The tube is moved into each of the joining stations $80_1$ to $80_4$ via the tool changing device and equipped with a first or additional attachable part and, via the tool changing device, again placed into the same or the subsequent workpiece transporting unit 10 for the purpose of continued transport. After having been transported transversely through the two subsequent rotary stations $82_2$, $82_3$, the tube is equipped with an additional attachable part in each of the four subsequent joining stations $80_5$ to $80_8$. It is also possible, for example, for pairs of attachable parts to be joined in the individual stations directly one after the other at identical rotational angles relative to the tube. Finally, in an ejecting station 85, the finish-equipped and joined shaft assembly (i.e., camshaft) is removed from the system and placed onto a transfer belt 86. Finally, the empty workpiece transporting units 10 are returned via a fourth rotary station $82_4$ into the equipping station 83.

Figure 7A:
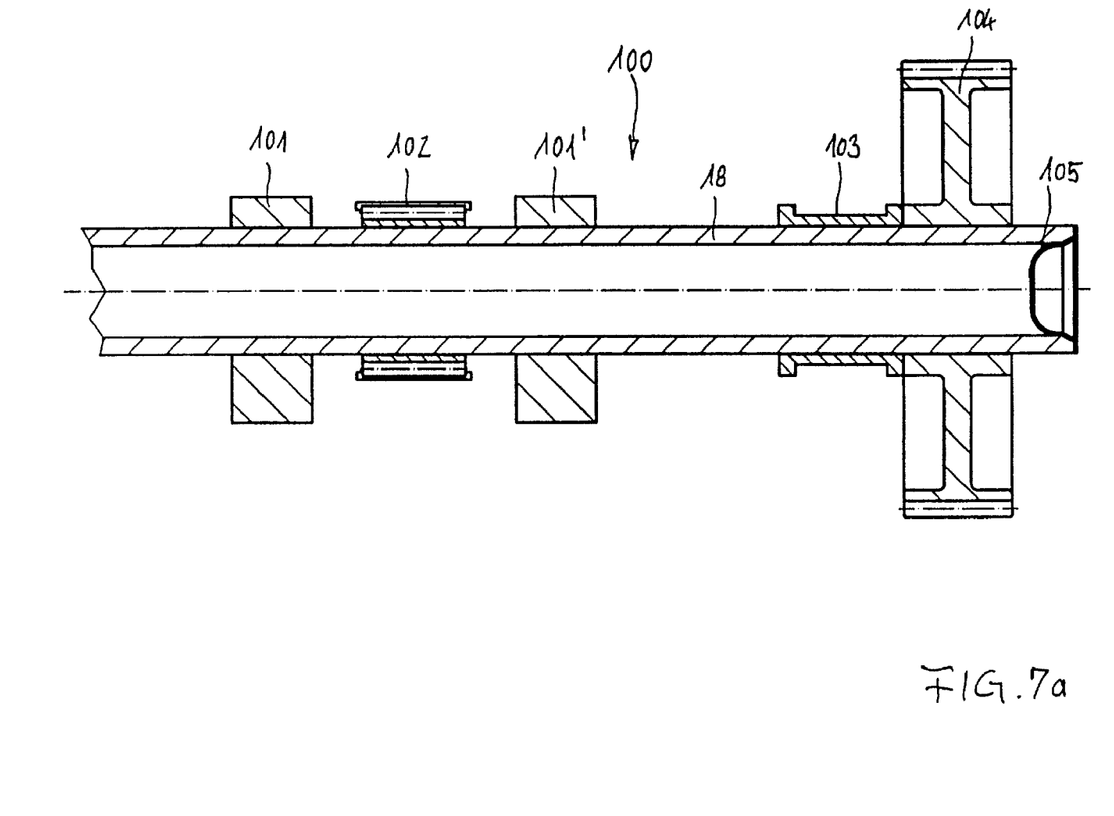
Figure 7B:
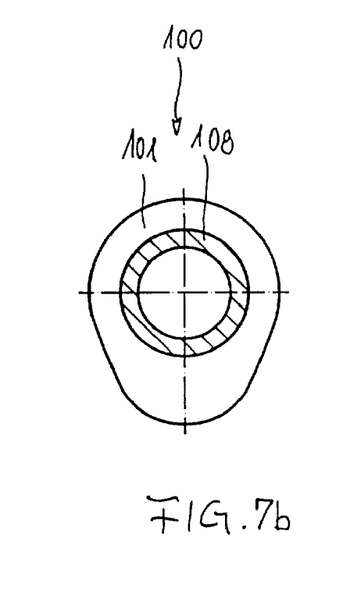

FIG. 7 shows part of an inventive shaft assembly in the form of a camshaft 100. Two cams 101, 101' are secured on the tubular member 18 in identical circumferential positions in accordance with the inventive method. A needle bearing 102 is loosely slid on between the two cams 101, 101'. At the end of the shaft 18 a friction bearing 103 and a gear 104 are included which are secured in accordance with the inventive method. A cover 105 is inserted into the open end of the shaft. The attachable parts 101, 101', 103, 104 have been slid on and secured by plastic deformation of the tube 18 one after the other. Of course, the attachable parts 101, 101', 103, 104 are only representative of the type of parts and overall assembly process contemplated by the present invention. They are provided as examples only and are not meant to be limiting.

Figure 8:
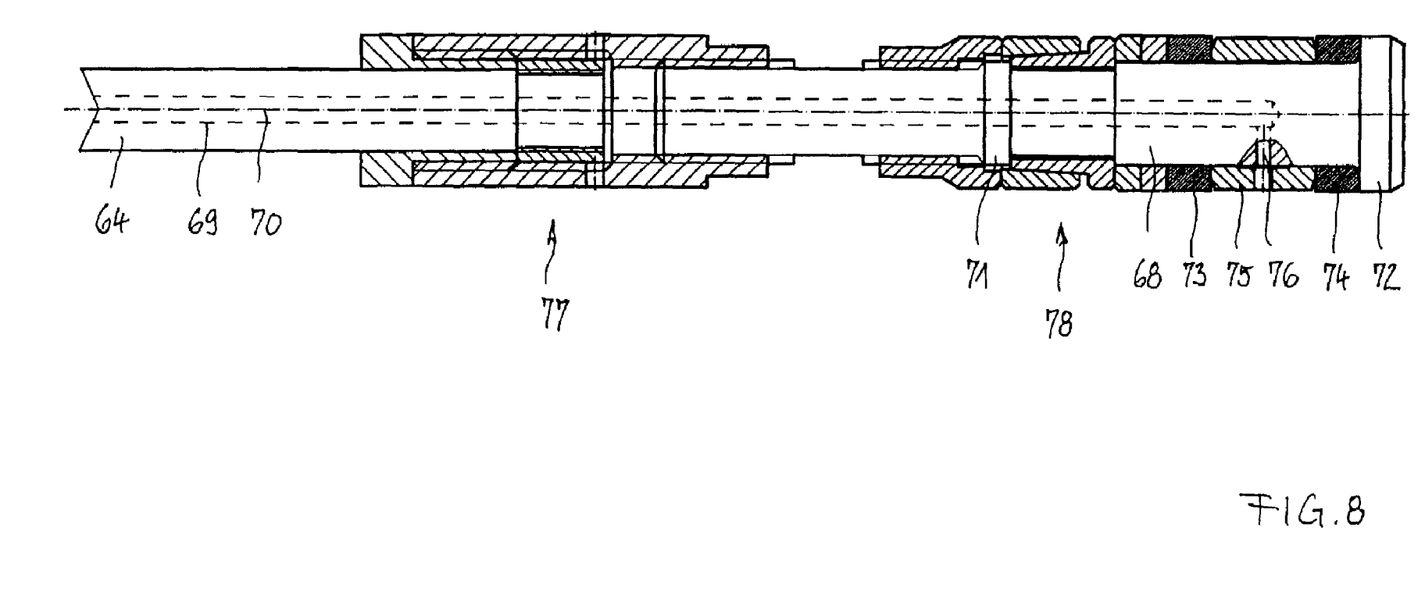
FIG. 8 shows an inventive probe head.

FIG. 8 shows the upper end of the probe member 64 with a bolted-on probe head 68. An inner bore 69 with an axis 70 passes through both probe member 64 and probe head 68. The bore 69 ends in the probe head 68 in the form of a blind bore. Between two collar portions 71, 72 on the probe head 68, there is positioned a plurality of sleeves which fix a pair of annular seals 73, 74 which are kept at a distance from one another by a spacing sleeve 75. The length of the sleeve 75 defines the operating range of the probe. A radial bore 76 starts from the central bore 69 and passes through the sleeve 75. A hydraulic pressure agent flows through the radial bore 76 into the operating range sealed inside the tube by the annular seals 73, 74. The probe member 64 and the probe head 68 are connected to one another by a threaded connection 77. The sleeve 75 and the annular seals 73, 74 are tensioned relative to the collar 72 by threaded tensioning mechanism 78.

From the foregoing, it can be seen that there has been brought to the art a new and improved method of and device for joining assembled hollow shafts. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A device for joining assembled hollow shafts comprising a tube defining an axis and attachable parts slid on to the tube, the device comprising:
    a single positioning and fixing unit (40) for the attachable parts; and
    a single holding and positioning device (20) for the tube, wherein the tube, inside the attachable parts, is radially plastically expanded in individual portions by applying internal pressure in such a way that the attachable parts are secured to the tube by a permanent press fit, and
    wherein the positioning and fixing unit (40) is fixed in space, and the holding and positioning device (20), with reference to the tube axis, is axially and rotatingly drivable relative to said positioning and fixing device (40).

2. A device according to claim 1, wherein an axis of the holding and positioning device (20) for the tube and a holding axis of the positioning and fixing unit (40) are aligned vertically.

3. A device according to claim 2 comprising a probe member (64) for expanding individual portions of the tube, wherein the probe member (64) comprises one single operating portion for expanding one individual portion of the tube (18).

4. A device according to claim 3, wherein the probe member (64)is adjustable between two axial positions, with the operating portion being positioned in a lower position below the positioning and fixing unit (40) and in an upper position inside the positioning and fixing unit (40).

5. A device according to claim 1 comprising a probe member (64) for expanding individual portions of the tube, wherein the probe member (64) comprises one single operating portion for expanding one individual portion of the tube (18).

6. A device according to claim 5, wherein the probe member (64) is adjustable between two axial positions, with the operating portion being positioned in a lower position below the positioning and fixing unit (40) and in an upper position inside the positioning and fixing unit (40).

7. A device according to claim 5, wherein the holding and positioning device (20) comprises a first holding device (22) for an exchangeable chuck (17, 23) for a tube.

8. A device according to claim 7 comprising a workpiece transporting unit (10) including a second holding device (16) for an exchangeable chuck (17, 23) for a tube.

9. A system according to claim 8, wherein the workpiece transporting unit (10) comprises a die (14) for a complete set of attachable parts for a tube.

10. A device according to claim 1, wherein the holding and positioning device (20) comprises a first holding device (22) for an exchangeable chuck (17, 23) for a tube.

11. A device according to claim 10 comprising a tool changing device (25) arranged at the holding and positioning device (20) for handling exchangeable chucks (17, 23).

12. A device according to claim 10 comprising a workpiece transporting unit (10) including a second holding device (16) for an exchangeable chuck (17, 23) for a tube.

13. A system according to claim 12 wherein the workpiece transporting unit (10) comprises a die (14) for a complete set of attachable parts for a tube.

14. A device according to claim 12 comprising a tool changing device (25) arranged at the holding and positioning device (20) for handling exchangeable chucks (17, 23).

15. A device according to claim 1 including a transport track (13) and a clamping mechanism for a workpiece transporting unit (10).

16. A device according to claim 1 comprising a horizontal transporting unit (30) for receiving and transferring individual attachable parts from a stand-by position into the positioning and fixing unit (40).

17. A system comprising a plurality of joining stations (80) each for joining assembled hollow shafts including a tube and an attachable part slid onto the tube wherein the tube, inside the attachable parts, is radially plastically expanded in individual portions by applying internal pressure in such a way that the attachable parts are secured to the tube by a permanent press fit, each joining station (80) comprising a single positioning and fixing unit (40) for the attachable parts and a single holding and positioning device (20) for the tube, the individual stations (80) being connected to one another linearly or in a loop via a transport path (81), and wherein the system comprises workpiece transporting units (10) transportable from station to station which each comprise a first holding device (16) for an exchangeable chuck for a tube, and wherein the holding and positioning device (20) of each joining station (60) includes a second holding device (22) for an exchangeable chuck for a tube.

18. A system according to claim 17 comprising at least one rotary station (82) for rotating a workpiece transporting unit (10) along the transport path (81).

19. A system according to claim 17 comprising at least one equipping station (83) for equipping each workpiece transport unit (10) with a complete set of attachable parts.

* * * * *

UNITED STATES PATENT AND TRADEMARK OFFICE
CERTIFICATE OF CORRECTION

| | | |
|---|---|---|
| PATENT NO. | : 7,096,575 B2 | Page 1 of 1 |
| APPLICATION NO. | : 10/360951 | |
| DATED | : August 29, 2006 | |
| INVENTOR(S) | : Jochen Asbeck and Henning Blocker | |

It is certified that error appears in the above-identified patent and that said Letters Patent is hereby corrected as shown below:

Column 10, Line 6, should read as follows: -- A device according to claim 3, wherein the probe --

Column 10, Line 57, should read as follows: -- positioning device (20) of each joining station (80) includes --

Signed and Sealed this

Twenty-first Day of November, 2006

JON W. DUDAS
*Director of the United States Patent and Trademark Office*